June 19, 1951 M. REIFSNYDER 2,557,688
COW STANCHION CONSTRUCTION
Filed Feb. 6, 1948 4 Sheets-Sheet 1

INVENTOR.
MILBURN REIFSNYDER
BY
Howson & Howson
ATTORNEYS

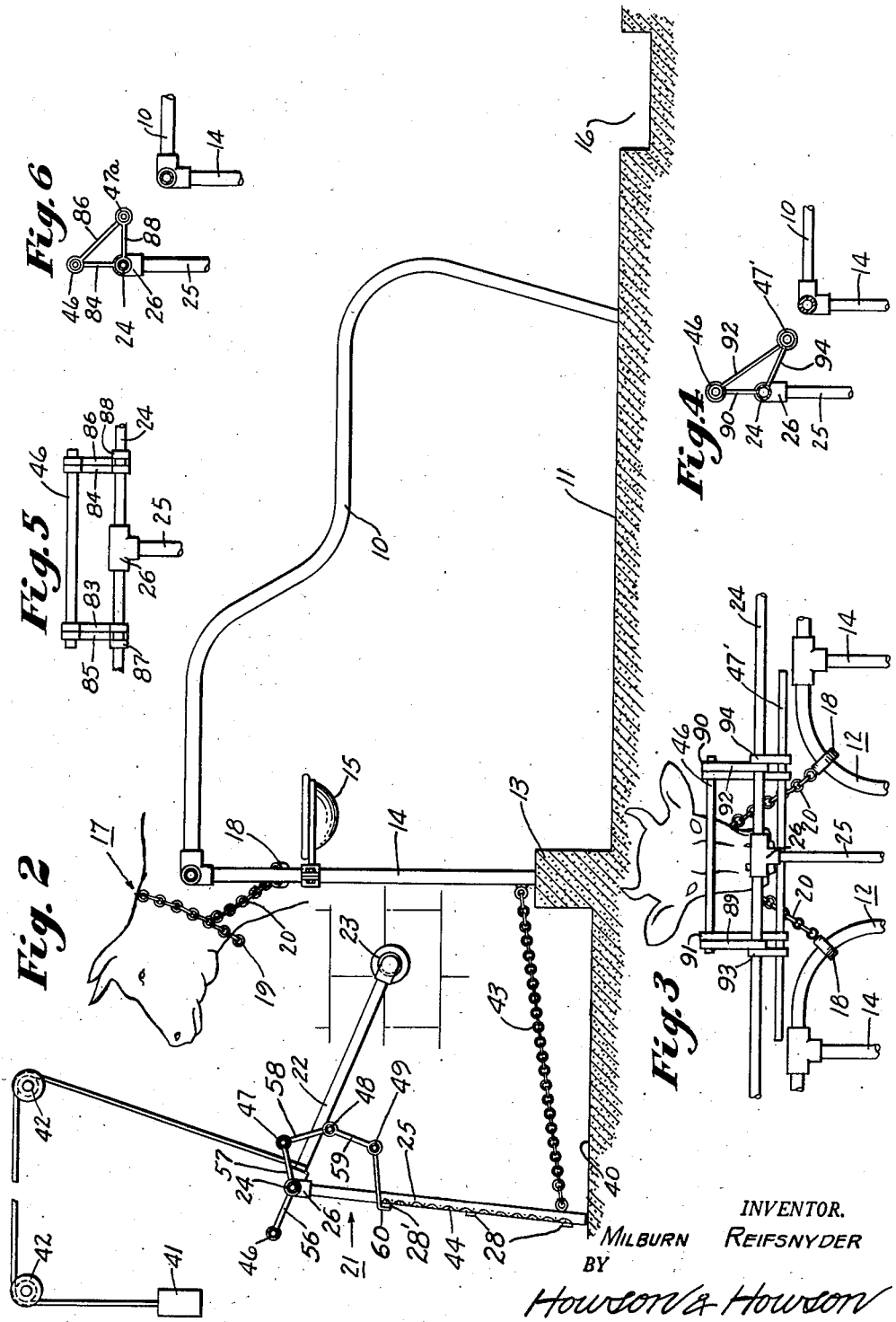

June 19, 1951  M. REIFSNYDER  2,557,688
COW STANCHION CONSTRUCTION
Filed Feb. 6, 1948  4 Sheets-Sheet 3

INVENTOR.
MILBURN REIFSNYDER
BY
Howson & Howson
ATTORNEYS

June 19, 1951 M. REIFSNYDER 2,557,688
COW STANCHION CONSTRUCTION
Filed Feb. 6, 1948 4 Sheets-Sheet 4

INVENTOR.
MILBURN REIFSNYDER
BY
Howson & Howson
ATTORNEYS

Patented June 19, 1951

2,557,688

UNITED STATES PATENT OFFICE 2,557,688

COW STANCHION CONSTRUCTION

Milburn Reifsnyder, Bernville, Pa.

Application February 6, 1948, Serial No. 6,595

13 Claims. (Cl. 119—147)

This invention relates to cow stanchion construction and more particularly to a barrier designed to limit the movement of a cow in a chain type stanchion.

Modern equipment for dairy barns is obtainable in two forms, the first of which comprises a rigid yoke adapted to engage the animal's neck and pivotally supported at the top by a long bar or rail and at the bottom by the floor or trough structure. An advantage of this construction resides in the fact that the animal has very limited fore and aft movement in the stall but the cost of the equipment itself and also of its installation is extremely high.

The cheaper, and what might be termed "popular" form of cow stanchion construction consists merely of a few lengths of pipe suitably bent to provide rails positioned transversely of the platform forming the stalls. A series of inverted U-shaped lengths of pipe are positioned in spaced relation to each other along the front of the stall structure and the front end of the rails is attached at the top of the U. The space between the vertical members of the forward U structures permits access to the feed trough. A chain yoke terminating in rings slidable on the vertical legs of the inverted U stanchion members retains the animal in the stall but at the same time permits considerable fore and aft movement. This inability to hold the animals in a relatively fixed position with respect to the gutter is a serious disadvantage of the chain type installation because when the animal is in an extreme forward position, droppings fall in the stall rather than the gutter. It is obviously impossible to adjust the gutter with respect to the stanchions once the barn has been built and it is likewise utterly impractical to remove all manure instantly. Therefore, the cow's udder is constantly in a dirty condition whenever the animal lies down and between times when it may be cleaned, such as before milking.

Naturally in a dairy herd, it is essential that milking cows be kept as clean as possible, and I have found that the inability to retain the cows in a chain type stall in a more or less fixed relation to the gutter means the expenditure of much time in cleaning and washing before milking, together with the concurrent tendency to increase the bacteria content of the milk. Heretofore, the only way of preventing this condition has been to install the much more expensive stanchions referred to above, but for many farmers the cost involved is prohibitive. The possibility of high bacteria content in milk and reduced health standards is obvious, and in fact, some communities will not permit milk to be sold unless the barns supplying the milk are equipped with the more expensive stanchions. This requirement, while beneficial to the public health, has closed some of the best markets to the small or less wealthy dairymen.

A primary object, therefore, of the invention is to provide an adjustable barrier adapted to be used on a chain type stall which limits the movement of the animals in the stall.

A further object of the invention is to provide a pivoting barrier for a chain type stall which in a lowered position serves as a feed and roughage trough.

A still further object of the invention is to provide an inexpensive accessory for chain type stanchions which is readily adaptable to the needs of any individual cow regardless of the animal's height or length.

Further objects will be apparent from the specification and drawings in which:

Fig. 2 is a transverse section of the structure of Fig. 1 but with the barrier in a lowered position and showing a cow chained to the stanchion;

Fig. 3 is a detail of a modified form of the invention with the screen removed;

Fig. 4 is a side elevation in detail of the structure of Fig. 3;

Fig. 5 is a further modified form of the animal positioning device;

Fig. 6 is a fragmentary side elevation of the structure of Fig. 5 but with a fragment of the stanchion shown to illustrate the relation of the positioning device thereto;

Figure 1:
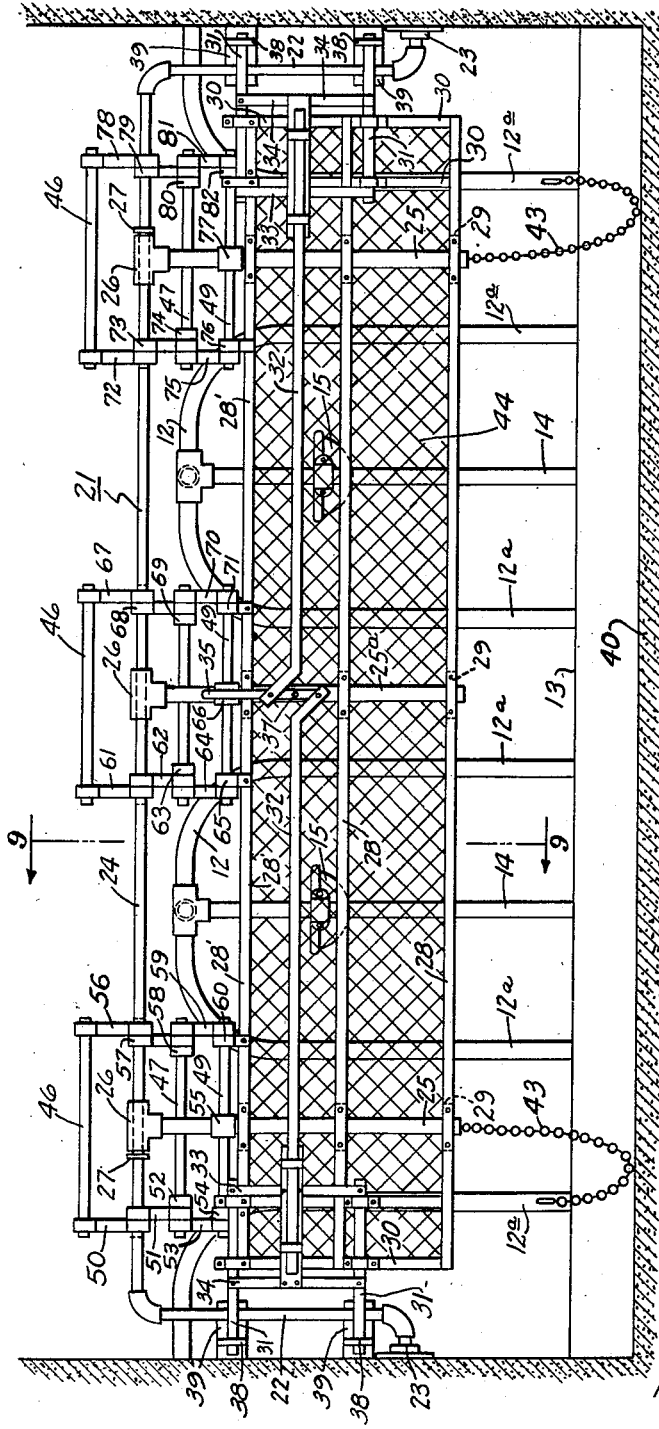
Fig. 1 is a front elevation of a preferred form of the invention as installed on a chain type cow stanchion.
Figure 7:
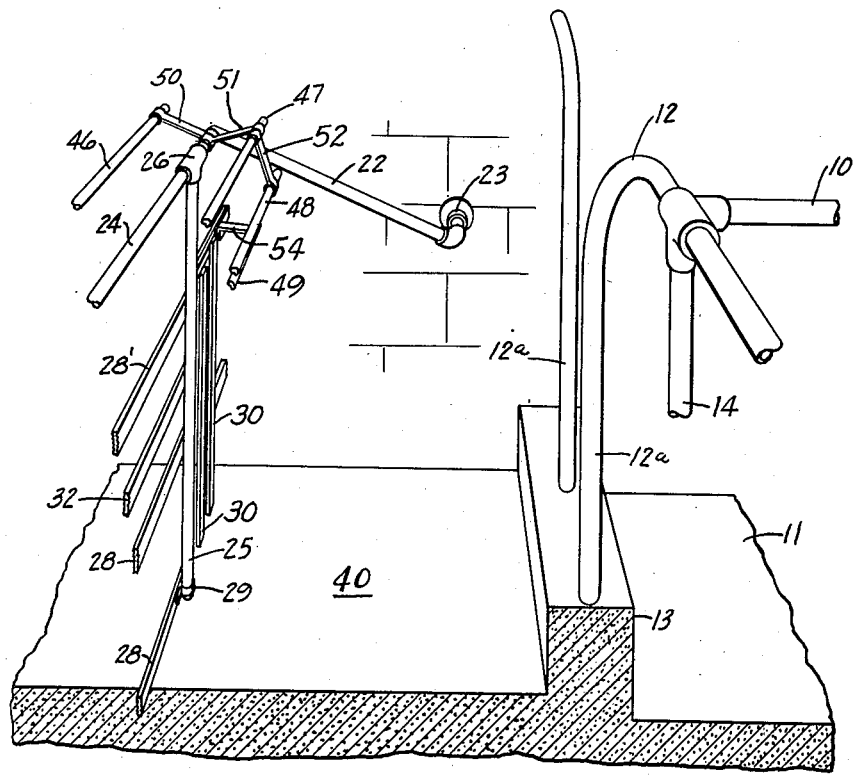
Fig. 7 is a perspective showing the barrier in the lowered position of Fig. 2 with the screen removed.

The invention comprises essentially the provision of a pivoted barrier adapted to be positioned in front of and in spaced relation to the conventional chain type cow stanchion. When in the raised position, the barrier limits the forward movement of the animal in the stall, but when in the lowered position, the barrier serves as a retainer for feed and roughage while at the same time, permitting access to the feed. The top rail of the barrier is provided with one or more short transverse bars which are adjustable with respect to the barrier so that the bars when raised serve as a secondary forward enclosure for the stall. The construction of the bar assemblies is such that a wide range of adjustment is readily obtainable to suit the needs of the individual cow.

Referring now more particularly to the drawings, the conventional chain type cow stanchions comprises a series of spacing rails 10 bent as shown in Fig. 2 which form the partitions separating the cows in the stalls. The rails 10 are customarily fabricated from pipe or tubing and are rigidly secured in the floor 11 at the rear and are supported in front by the top of an inverted U-shaped member 12 which is likewise imbedded in the floor 11 or wall 13. A vertical reinforcing post 14 bisects the U and also supports the conventional watering bowl 15.

The installation of the stanchion assemblies in a barn is such that the space between the vertical sections of members 12a accommodates one cow and permits access of the cow to the feed trough in front of the stanchion. Likewise, the distance between the U-shaped members 12 and the gutter 16 is of necessity designed for the average animal and of course cannot be varied once the stanchion has been installed. Not only does the size of different breeds vary, for example the Holstein is a much larger animal than the Jersey, but there may be considerable variation between animals of the same breed which in turn is dependent upon the age of the animal. Therefore, it will be apparent that the location of the gutter with respect to the stanchion construction cannot be adjusted to suit the needs of individual animals and if designed, for example, for a large Holstein, it will be clear that the gutter is utterly inadequate for a smaller animal.

The conventional chain yoke 17 has a pair of rings 18 adapted to slide on vertical sections 12a of the U-shaped members 12. Retention of the animal is achieved by looping the yoke portion 19 of the chain around the animal's neck, but the connecting chains 20 must be sufficiently long to enable the cow to reach its feed as well as to lie down in the stall. Obviously, the sliding of rings 18 on pipe sections 12a enables fore and aft movement of several feet in the stall.

In order to restrict the fore and aft movement referred to above, I provide a pivoted barrier assembly designated generally at numeral 21, which comprises two arms formed of lengths of pipe 22, 22 pivotally mounted in sockets 23, 23 and connected laterally by a transverse pipe or rail 24. A plurality of vertical posts 25, 25 are swingably supported on pipe 24 by means of T's 26 and retained laterally thereon by collars 27, 27. A plurality of transverse rails 28, 28 which may likewise be of tubing or of strap iron, are secured to posts 25 by means of clamps 29.

The construction illustrated in Fig. 1 shows a unitary barrier adapted for use in front of three stalls, but it will be obvious that the same construction may be equally well employed for one, two or even more stalls. Likewise, in the construction shown in Fig. 1, the posts 25 are centrally located with respect to each stall so that the rails 28 extend laterally beyond the posts and are connected by vertical members 30, 30.

A locking mechanism may be provided, if desired, for retaining the barrier in a raised position, and in the form shown in Fig. 1, comprises a pair of laterally sliding bolts 31, 31 actuated by cross arms 32, 32 through members 33, 33 and 34, 34. Lever 35 pivoted on post 25a at 37 operates to move arms 32 in a transverse direction to engage bolts 31, 31 on keepers 38.

Abutments 39, 39 limit the upward pivoting movement of arms 22, whereas downward pivoting movement is limited when the bottoms of posts 25 contact alley 40. If desired, a counterweight 41 operating on pulleys 42, 42 may be employed to assist the raising of the barrier but I have found that where the construction is applied to less than three stalls, the counterweight may be found to be unnecessary. When the barrier 21 is in the lowered position of Fig. 2, the space between the barrier and the stanchions forms the feed trough for the animals and is adapted to accommodate hay, grain and ensilage. A retaining chain 43 may be used, if desired, to limit the pivoting action of posts 25 on pipe 24, but ordinarily the weight of the barrier itself serves to retain it sufficiently on alley 40.

In the preferred form, I have shown the lower portion of the barrier formed by rails 28 as supporting a screen or wire mesh 44 which serves to retain ensilage and grain in the feed trough. Where the conventional concrete trough wall (not shown) is used, screen 44 may be dispensed with. The height of the barrier when in the lowered position is ample to retain roughage, especially hay, from being scattered beyond the reach of the cows.

Figure 8:
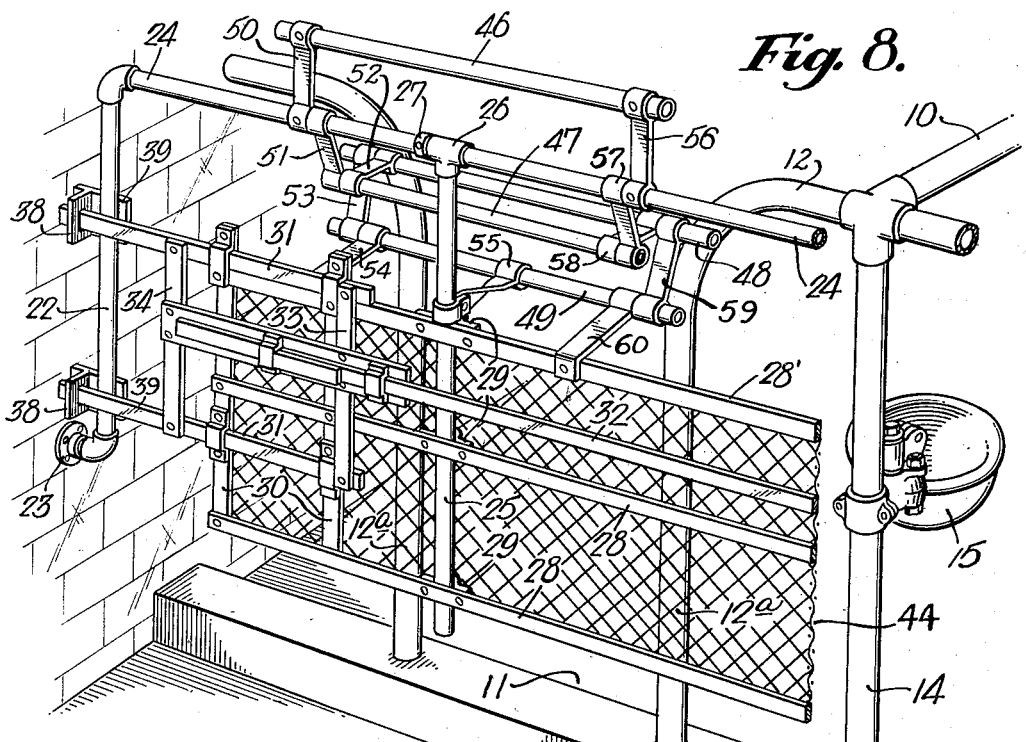
Fig. 8 is a perspective showing the left-hand portion of the structure of Fig. 1.
Figure 9:
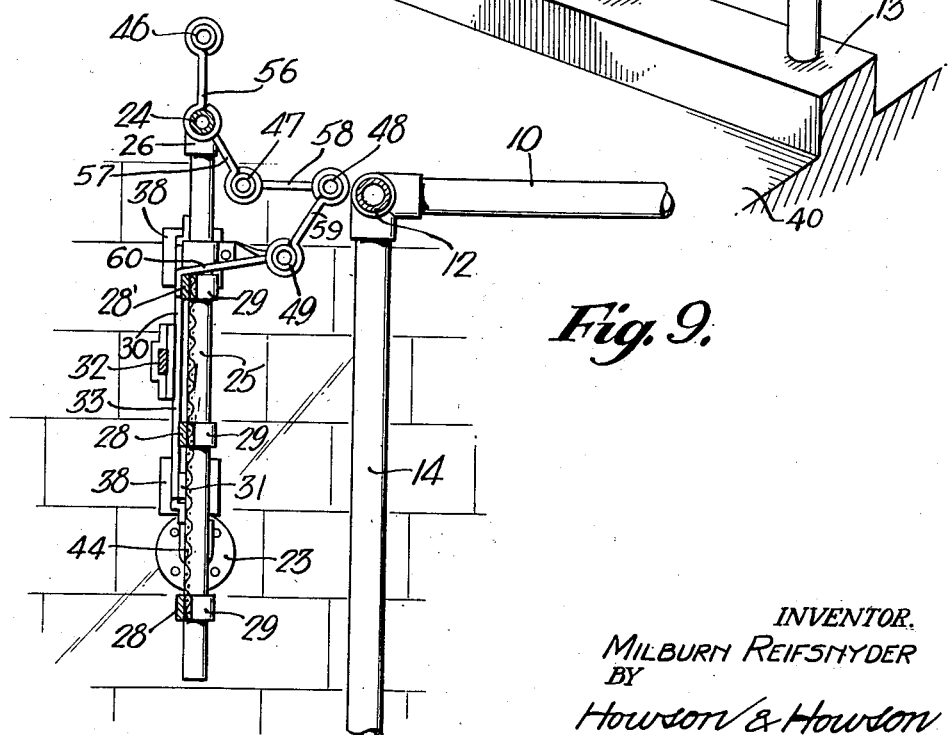
Fig. 9 is an enlarged sectional view as seen at 9—9 of Fig. 1.

Referring now to Figs. 1, 8 and 9, the upper rail 24 of the barrier is provided with a plurality of short cross members 46, 47, 48 and 49 substantially opposite or in registry with each of the cow stalls. The uppermost cross member 46 for the left-hand stall is supported directly on rail 24 by means of brackets 50 and 56 which are identical to each other and desirably are fabricated from lengths of strap iron. Cross member 47 is held in a downward and inward position by means of brackets 51 and 57. Cross member 48 in the showing of Figs. 8 and 9, is substantially in the same horizontal plane as cross member 47 when the barrier is raised, and is connected to member 47 by means of brackets 52 and 58. Cross member 49 is supported in a downward and somewhat farther removed position with respect to the stanchion by means of brackets 53 and 59 which connect members 48 and 49. Cross member 49 is tied to upper rail 28' by means of brackets 54, 55 and 60 as shown clearly in Fig. 8. Since the top barrier rail 28' pivots with post 25 relative to rail 24, brackets 51—54 and 57—59 permit relative pivotal or turning movement between the rails and the brackets when the barrier is raised or lowered. The construction shown in Fig. 1 with regard to the cross members is similar for each stall, and brackets 61, 67, 72 and 78 are identical to and perform the same functions as brackets 50 and 56. Likewise, brackets 62, 68, 73 and 79 are identical to brackets 51 and 57. Brackets 63, 69, 74 and 80 are identical to brackets 52 and 58. Brackets 64, 70, 75 and 81 are identical to brackets 53 and 59. Brackets 65, 71, 76 and 82 are identical to brackets 54 and 60; and brackets 66 and 77 are identical to bracket 55. Fig. 2 illustrates the position assumed by cross members 46—49 when the barrier is in the lowered position and the purpose of this action is to insure the maximum space in the feed trough. It will be apparent that the relative positions of cross members 46—49 may be adjusted by loosening the brackets 50 to 82 and also by substituting other brackets of various different lengths so that the desired individual adjustment may be achieved. It will thus be apparent that in the raised position of Fig. 8, the cross bars extend transversely between the openings of the stanchions thereby preventing the animal from moving forward in the stall, whereas, in the lowered position, the cross bars assist in retaining roughage thereby insuring that it is at all times accessible to the cows.

While Fig. 8 illustrates the preferred construction of the auxiliary barrier, it will be obvious that many modifications of this accessory may be employed depending upon the needs of individual animals. Figs. 3–6 illustrate some of these modifications in which the length of the brackets or the positioning of the bars is modified to provide variable spacing between the bars and the stanchion.

Referring now more particularly to Figs. 5 and 6, the horizontal cross member 46 is clamped vertically with respect to rail 24 by means of brackets 83 and 84 and the second cross member 47a is in this modification supported in a horizontal plane substantially parallel to rail 24. Cross member 47a is held by inclined, elongated brackets 85 and 86 and horizontal brackets 87 and 88. In this modification, the cross members may be adjusted with respect to the barrier but no pivotal motion occurs when the barrier is raised and lowered.

Figs. 3 and 4 illustrate a further modified arrangement of the supplementary cross members in which the uppermost cross member 46 is supported by brackets 89 and 90. The secondary cross member 47' in this form is substantially longer than the corresponding cross member 47 of Figs. 8 and 9, and is positioned substantially lower than rail 24 by means of relatively long inclined brackets 91, 92 and standard length brackets 93, 94 identical to brackets 50—82 and 87—90. The flexibility of the cross member assembly to provide for a wide range of adjustments is an important feature of the construction since the farmer is thereby enabled to position his cattle in the stalls much more accurately than has heretofore been possible. Furthermore, the construction of the brackets 50—94 may be such that an overlapping construction for each bracket may be employed with a plurality of spaced holes enabling the individual brackets to be lengthened or shortened as desired.

I have thus provided an adjustable accessory for a chain type cow stanchion which is extremely inexpensive to fabricate and install, thus placing it within the reach of all farmers and which provides many advantages not even found in the much more expensive cow stalls. Specifically, it limits the need for a built-in feed trough. Each animal is accurately positioned in the stall at all times, except when feeding. This not only insures cleaner animals and less bacteria, as explained above, but also assists in the milking operation because the cow's movement is restricted and thus always retained in the most favorable milking position.

I claim:

1. A barrier assembly for chain-type cow stanchions, comprising a horizontal bar positioned in front of and in spaced relation to a cow stanchion, a supporting structure adjacent each terminal end of the barrier assembly, a socket mounted on said supporting structure, an arm pivotally mounted in each of said sockets, said arms being rigidly connected to each end of the bar, and a limit stop for the arms to retain the bar and arms in a raised position, said bar and pivoting arms constructed to swing from the lowered feeding position to a raised non-feeding position relatively closer to the stanchion, whereby in such raised position the bar serves as a barrier for preventing access to a feed trough of an animal chained in the stall.

2. A barrier assembly in accordance with claim 1, having a short cross bar parallel with and attached to the horizontal bar and extending substantially upwards therefrom, the length of said short cross bar being approximately equal to the distance between adjacent stanchions, and a second cross bar adjustably clamped in parallel relation to the horizontal bar, the second cross bar extending substantially from the center of one stanchion to the center of an adjoining stanchion.

3. A barrier assembly in accordance with claim 1, having a short cross bar adjustably clamped to the horizontal bar and positioned parallel to said cross bar, a second cross bar adjustably clamped to the horizontal bar parallel to and in alignment with the first cross bar, and a pair of brackets connecting the horizontal bar and the first and second cross bars.

4. A barrier assembly in accordance with claim 1, having means for locking the horizontal bar when in the raised animal retaining position.

5. A barrier assembly in accordance with claim 1, having a relatively short cross bar clamped parallel to and substantially above the horizontal bar when in the raised position, a second cross bar clamped to the horizontal bar and extending parallel to said horizontal bar and spaced between the bar and the stanchion, a third cross bar pivotally attached to the second cross bar and extending substantially parallel to said cross bar between said second cross bar and the stanchion, a fourth cross bar pivotally clamped to said third cross bar and extending parallel to and substantially below said third cross bar, and a connection between said fourth cross bar and the horizontal bar whereby the pivotally clamped cross bars swing to a retracted position when the horizontal bar is lowered.

6. A barrier assembly in accordance with claim 1, having a relatively short cross bar clamped parallel to and substantially above the horizontal bar when in the raised position, a second cross bar clamped to the horizontal bar and extending parallel to said horizontal bar and spaced between the bar and the stanchion, a third cross bar pivotally attached to the second cross bar and extending substantially parallel to said cross bar between said second cross bar and the stanchion, a fourth cross bar pivotally clamped to said third cross bar and extending parallel to and substantially below said third cross bar, a connection between said fourth cross bar and the horizontal bar whereby the pivotally clamped cross bars swing to a retracted position when the horizontal bar is lowered, and a bracket connecting said fourth cross bar with the feed-retaining element whereby the pivotally clamped cross bars swing to a retracted position when the horizontal bar is lowered.

7. A barrier assembly for chain-type cow stanchions, comprising a horizontal bar positioned in front of and in spaced relation to a cow stanchion, a supporting structure in spaced relation to each end of the horizontal bar, pivot means on said supporting structures, a pair of arms movable in vertical planes for cooperating with said pivot means and on which said bar is mounted, said pivot means and arms being so constructed and arranged to arcuately swing said bar from a lowered position to a raised position relatively closer to the stanchion, whereby in such raised position the bar serves as a barrier for preventing access to a feed trough by an animal chained in the stall, and a feed-retaining element pivotally suspended from said bar.

8. A barrier assembly in accordance with claim 7, having means for retaining the bottom of the feed retaining element with respect to the stanchion when in the lowered position.

9. A barrier assembly in accordance with claim 7, in which the feed retaining element comprises a plurality of posts pivoted to the horizontal bar, cross members connecting said posts and a screen attached to said posts and cross members.

10. A barrier assembly in accordance with claim 7, having a plurality of adjustable cross bars clamped to the horizontal bar in alignment with the stalls formed between the stanchions.

11. A barrier assembly for chain-type cow stanchions comprising a horizontal bar positioned in front of and in spaced relation to a cow stanchion, said bar being adapted to swing from a lowered feeding position to a raised non-feeding position relatively close to the stanchion, whereby in such raised position the bar serves as a barrier for preventing access to a feed trough by an animal chained in the stall, a pair of pivotally mounted supporting arms for said bar, a pivot for each of said supporting arms, a limit stop for each of said supporting arms, said pivot being substantially below and in vertical alignment with the bar and limit stop when the bar is in a raised position, and a plurality of horizontal cross bars attached to said horizontal bar in spaced relation to the front of the stanchion.

12. A barrier assembly constructed in accordance with claim 11, in which the horizontal bar extends longitudinally in front of a plurality of cow stalls formed between the stanchions, and in which the cross bars are in alignment with said stalls.

13. A barrier assembly for chain-type cow stanchions comprising a horizontal bar positioned in front of and in spaced relation to a cow stanchion, said bar being adapted to swing from a lowered feeding position to a raised non-feeding position relatively close to the stanchion, whereby in such raised position the bar serves as a barrier for preventing access to a feed trough by an animal chained in the stall, a pair of pivotally mounted supporting arms for said bar, a plurality of relatively short parallel cross bars clamped in lateral spaced relation to the horizontal bar, and means for rotatably adjusting said cross bars with respect to the axis of the horizontal bar.

MILBURN REIFSNYDER.

REFERENCES CITED

The following references are of record in the file of this patent:

UNITED STATES PATENTS

| Number | Name | Date |
|---|---|---|
| 424,020 | Nisson | Mar. 25, 1890 |
| 1,209,688 | Drew | Dec. 26, 1916 |
| 1,269,827 | Lewis et al. | June 18, 1918 |
| 1,481,108 | Neller | Jan. 15, 1924 |
| 1,738,068 | Hiter | Dec. 3, 1929 |
| 2,023,774 | Sterling | Dec. 10, 1935 |

FOREIGN PATENTS

| Number | Country | Date |
|---|---|---|
| 16,348 | Denmark | Aug. 26, 1912 |
| 89,499 | Switzerland | June 1, 1921 |
| 592,027 | Germany | Jan. 31, 1934 |